United States Patent
Sellschopp

(10) Patent No.: US 10,657,288 B2
(45) Date of Patent: May 19, 2020

(54) METHOD FOR OPERATING A MOTOR VEHICLE, AND SYSTEM FOR OPERATING A MOTOR VEHICLE

(71) Applicant: Audi AG, Ingolstadt (DE)

(72) Inventor: Stefan Sellschopp, Dachau (DE)

(73) Assignee: Audi AG, Ingolstadt (DE)

( * ) Notice: Subject to any disclaimer, the term of this patent is extended or adjusted under 35 U.S.C. 154(b) by 314 days.

(21) Appl. No.: 15/749,850

(22) PCT Filed: Jul. 25, 2016

(86) PCT No.: PCT/EP2016/001289
§ 371 (c)(1),
(2) Date: Feb. 2, 2018

(87) PCT Pub. No.: WO2017/020999
PCT Pub. Date: Feb. 9, 2017

(65) Prior Publication Data
US 2018/0222442 A1    Aug. 9, 2018

(30) Foreign Application Priority Data
Aug. 5, 2015 (DE) .................. 10 2015 010 203

(51) Int. Cl.
G06F 21/62    (2013.01)

(52) U.S. Cl.
CPC .................. *G06F 21/629* (2013.01)

(58) Field of Classification Search
CPC ....... B60R 25/01; B60R 25/24; B60R 16/037; B60R 25/241; G05D 1/0016;
(Continued)

(56) References Cited

U.S. PATENT DOCUMENTS

2011/0128118 A1* 6/2011 Gilleland ................ B60R 25/24
                                                                  340/5.2
2011/0137490 A1   6/2011 Bosch et al.
(Continued)

FOREIGN PATENT DOCUMENTS

DE        10212259 A1    5/2003
DE   102004049297 A1    4/2006
(Continued)

OTHER PUBLICATIONS

International Preliminary Report on Patentability directed to related International Patent Application No. PCT/EP2016/001289, dated Nov. 7, 2017, with attached English-language translation; 16 pages.
International Search Report and Written Opinion of the International Searching Authority directed to related International Patent Application No. PCT/EP2016/001289, dated Oct. 26, 2016, with attached English-language translation; 20 pages.
(Continued)

*Primary Examiner* — Dale Moyer
(74) *Attorney, Agent, or Firm* — Sterne, Kessler, Goldstein & Fox P.L.L.C.

(57) ABSTRACT

The invention relates to a method for operating a motor vehicle. A vehicle-external server device generates a vehicle function list that specifies which vehicle-internal functions of the motor vehicle have a use authorization and which vehicle-internal functions of the motor vehicle do not have a use authorization. The vehicle function list is wirelessly transmitted from the vehicle-external server device to a control device of the motor vehicle Respective controllers designed to operate the vehicle-internal functions of the motor vehicle are actuated according to the transmitted vehicle function list by means of the control device such that the internal functions which have a use authorization and which are still deactivated are activated, and the internal functions which do not have a use authorization and which are still activated are deactivated.

14 Claims, 1 Drawing Sheet

(58) Field of Classification Search
CPC . G06F 21/6218; G06F 21/629; H04L 41/082; H04L 2012/40273
See application file for complete search history.

(56) References Cited

U.S. PATENT DOCUMENTS

| | | | |
|---|---|---|---|
| 2012/0072055 A1* | 3/2012 | Barlsen | B60T 8/885 701/2 |
| 2016/0001720 A1* | 1/2016 | Vadgama | B60R 16/037 701/2 |
| 2018/0018591 A1* | 1/2018 | Shiraishi | H04L 67/38 |

FOREIGN PATENT DOCUMENTS

| | | | | |
|---|---|---|---|---|
| DE | 102006052048 A1 * | 5/2008 | | G06F 21/629 |
| DE | 102006052048 A1 | 5/2008 | | |
| DE | 102008008108 A1 | 8/2009 | | |
| DE | 102009025585 A1 | 12/2010 | | |
| EP | 2333636 A1 | 6/2011 | | |

OTHER PUBLICATIONS

English-language abstract of German Patent Application Publication No. DE 10212259 A1, published May 8, 2003; 1 page.
English-language abstract of German Patent Application Publication No. DE 102004049297 A1, published Apr. 27, 2006; 1 page.
English-language abstract of German Patent Application Publication No. DE 102006052048 A1, published May 8, 2008; 2 pages.
English-language abstract of German Patent Application Publication No. DE 102008008108 A1, published Aug. 13, 2009; 1 page.
English-language abstract of German Patent Application Publication No. DE 102009025585 A1, published Dec. 23, 2010; 1 page.

\* cited by examiner

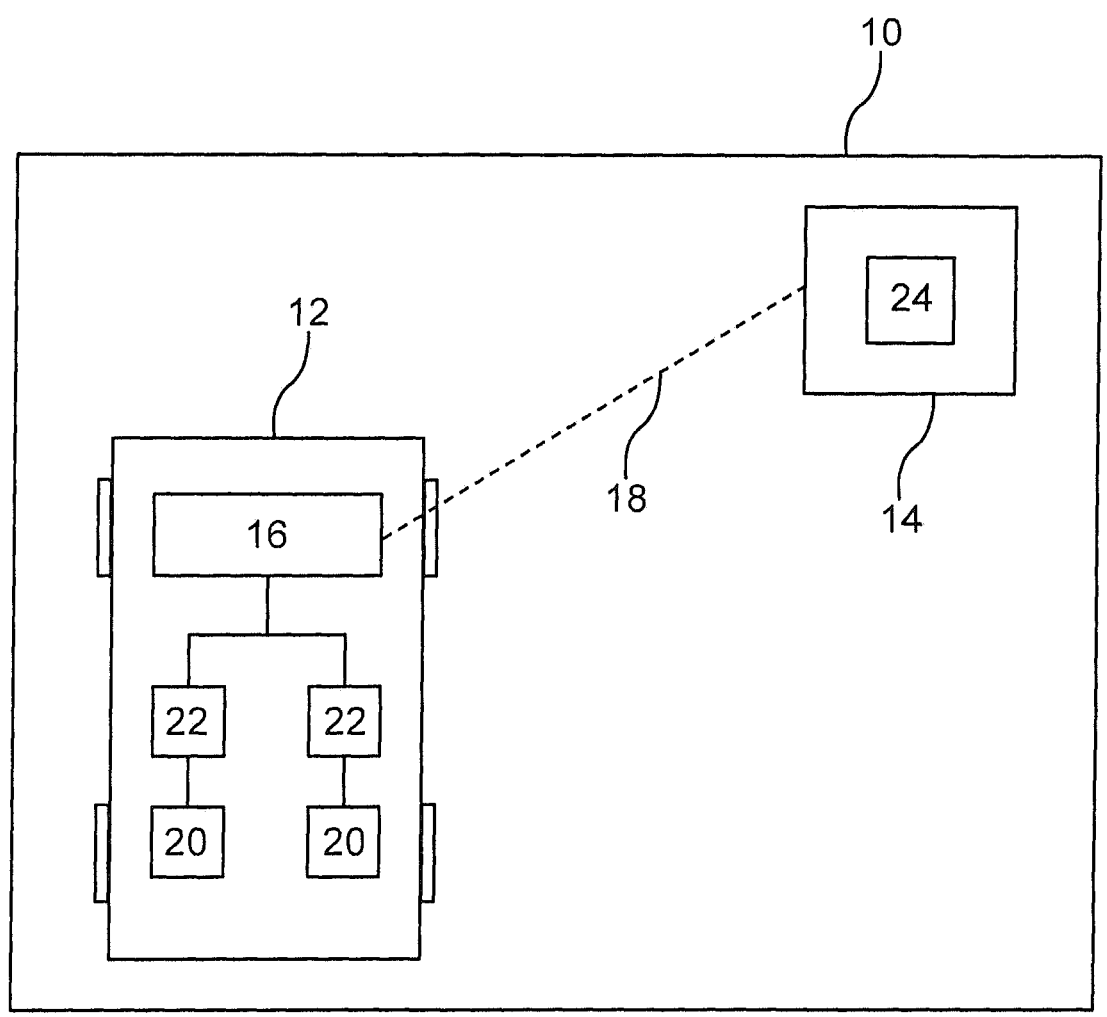

METHOD FOR OPERATING A MOTOR VEHICLE, AND SYSTEM FOR OPERATING A MOTOR VEHICLE

TECHNICAL FIELD

The invention relates to a method for operating a motor vehicle, as well as a system for operating a motor vehicle

BACKGROUND

DE 10 2009 025 585 A1 shows a device for the decentralized function activation of a control unit of a vehicle. The device comprises a production server for transmitting activation data. Furthermore, the device has an activation module that can be switched between the production server and the control unit, a limited number of activations being possible, independent of the production server, by means of the activation module.

DE 10 2004 049 297 A1 shows a method for activating and deactivating vehicle control unit functions. The activation or deactivation of the control unit functions is done via a communication interface.

DE 10 2006 052 048 A1 shows a method for activating and deactivating functions of a motor vehicle. For the activation and/or deactivation of a function, a conversion request is generated by the dealer or workshop after the motor vehicle is delivered. On the basis of the conversion request, a function-dependent and vehicle-dependent code is generated by the manufacturer. The function-dependent and vehicle-dependent code is entered into a diagnostic device by the dealer or workshop and transmitted to a control unit in the vehicle via the diagnostic device, the control unit checking the code and permitting or not permitting the activation or deactivation of the respective function as a function of the check.

BRIEF DESCRIPTION OF THE DRAWINGS/FIGURES

FIG. 1 illustrates a schematic representation of a system that comprises a motor vehicle and a vehicle-external server device by means of which various vehicle-internal functions of the motor vehicle can be activated and deactivated.

DETAILED DESCRIPTION

It is the object of the present invention to provide a method and a system by means of which vehicle-internal functions of a motor vehicle can be activated and deactivated in an especially simple manner.

This object is achieved by a method as well as by a system for operating a motor vehicle having the features of the independent claims. Advantageous embodiments having useful and non-trivial further developments of the invention are indicated in the dependent claims.

In the method according to the invention for operating a motor vehicle, a server device is used to create a vehicle function list in which it is laid down which vehicle-internal functions of the motor vehicle have a use authorization and which functions of the motor vehicle do not have a use authorization. Then, the vehicle function list is transmitted wirelessly from the vehicle-external server device to a server device of the motor vehicle. Afterwards, control units designed to operate the vehicle-internal functions of the motor vehicle are controlled according to the transmitted vehicle function list by means of the control device such that the vehicle-internal functions of the motor vehicle having use authorization and still being deactivated are activated and the vehicle-internal functions of the motor vehicle having no use authorization and still being activated are deactivated.

The vehicle-internal functions of the motor vehicle are functions that can be operated in the vehicle without a data connection to vehicle-external units. The vehicle-internal functions can, for example, be a cruise control system, a cruise control system for maintaining distance between vehicles, an autopilot or the like.

Using the method according to the invention, it is therefore possible to switch on or switch off various vehicle-internal functions of the motor vehicle in a secure manner via the vehicle-external server. This makes it possible, in particular, to sell and also switch off certain vehicle-internal functions of the motor vehicle at a later point in time. In particular, a sale of vehicle-internal functions at a later point in time could unlock further sales potential for vehicle manufacturers, a particularly simple process for activating the vehicle-internal functions being made possible by the method according to the invention.

Furthermore, it is possible in particular to use the method according to the invention to switch off certain vehicle-internal functions at a later point in time. This can, for example, be crucial from a legal perspective if it is a matter of being able to offer new driver assistance systems and react to new developments without the need for recall campaigns. This is because the method according to the invention also makes it possible to deactivate vehicle-internal functions that, for example, concern new driver assistance systems of this kind.

The vehicle-external server device can also be used to configure which vehicle-internal functions the motor vehicle in question is to have. Furthermore, the method is also in particular designed to activate and deactivate vehicle-internal functions in multiple different motor vehicles. In particular, it is also possible to select which vehicle-internal functions of the motor vehicles in question are to be activated or deactivated for a whole group of different motor vehicles.

Preferably, the motor vehicle can already have all the necessary means for operating the vehicle-internal functions in the form of software and hardware before leaving the factory. Creating and transmitting the vehicle function list makes it possible to be determined at a later point in time, that is, after the motor vehicle has been manufactured, which of the vehicle-internal functions are to have a use authorization and which are not to have it. If necessary, the vehicle function list can be regenerated again and again in a dynamic manner, it being possible to determine the respective use authorizations for the different vehicle-internal functions as needed. For the purpose of transmitting the vehicle function list from the vehicle-external server device to the control device of the motor vehicle, the control device itself or the motor vehicle can, for example, have a communication module having an integrated SIM card. In this case, it may be provided that the vehicle-external server device tries to establish a wireless connection with the motor vehicle in question as soon as a new vehicle function list has been generated. As soon as a wireless connection has been established between the vehicle-external server device and the motor vehicle, the newly created vehicle function list can be transmitted to the control device of the motor vehicle, as a result of which the vehicle-internal functions in question of the motor vehicle are activated or deactivated according to the transmitted vehicle function list.

An advantageous embodiment of the invention provides that the vehicle function list is created as soon as the vehicle-external server device has produced at least one activation specification with regard to at least one of the vehicle-internal functions, a use authorization being granted for this vehicle-internal function. For example, it is possible for an owner of the motor vehicle to have taken out a particular subscription for a particular vehicle-internal function. For example, he/she can do this via his/her smartphone, via a PC, via a tablet computer or even via a vehicle-internal interface. As soon as this subscription has been taken out, a corresponding activation specification with regard to the vehicle-internal function in question is produced, as a result of which the vehicle function list is created accordingly. After the motor vehicle has been manufactured, it is also possible for a person to activate corresponding vehicle-internal functions that did not have a use authorization previously and could also not yet be performed up to that point at a later point in time and in a simple manner, preferably in exchange for a corresponding payment.

A further advantageous embodiment of the invention provides that the vehicle function list is created as soon as the vehicle-external server device has produced at least one deactivation specification with regard to at least one of the vehicle-internal functions, no use authorization being granted for this vehicle-internal function. In other words, the use authorization is taken away for the vehicle-internal function in question if there was still a use authorization up to that point.

In this context, it can, for example, be provided that the deactivation specification is created as soon as a specified operating period has expired for the vehicle-internal function. If, for example, the vehicle owner has a temporary subscription for a particular vehicle-internal function and the subscription period of the subscription has expired, a corresponding deactivation specification with regard to the vehicle-internal function in question is created, as a result of which the vehicle function list is created and then transmitted to the control device of the motor vehicle. As a result of this, the vehicle-internal function in question is deactivated. To inform the owner or another driver of the motor vehicle that a particular vehicle-internal function will soon be deactivated, it may be provided that a corresponding alert message, for example one week before the expiration of a certain subscription with regard to a vehicle-internal function, is displayed by means of a display device in the vehicle.

Furthermore, it can also be provided that the deactivation specification is created as soon as there is a malfunction of the vehicle-internal function or a different vehicle-internal function. If, for example, a vehicle manufacturer discovers that there are certain problems with a particular driver assistance system, the vehicle manufacture does not need to start a costly recall campaign. Instead, it can ensure that a corresponding vehicle function list is generated on the vehicle-external server device, according to which the use authorization with regard to the critical vehicle-internal function is revoked. Critical vehicle-internal functions can thus be deactivated remotely in a simple manner, in particular if they pose an operational risk due to malfunctions. Preferably, a message that says which vehicle-internal functions are currently being affected and for what reasons and which have been deactivated for those reasons is issued within the motor vehicle in question. As soon as the problem with the vehicle-internal function in question is remedied, the vehicle-internal function can be activated again via the vehicle-external server device. Furthermore, it is also possible for the deactivation specification to be created as soon as there is a change in the legal framework conditions or due to further, other assessments. For example, the deactivation specification can be created if content that could previously be displayed, such as videos, can no longer be displayed by means of a display device in the motor vehicle while driving because, for example, the legal department of the automobile manufacturer has changed its opinion with respect to this, the case law in a particular country has changed with respect to this or because the automobile manufacture would like to be more cautious with respect to this.

According to a further advantageous embodiment of the invention, it is provided that the vehicle function list is only transmitted from the vehicle-external server to the control device of the motor vehicle if the control device has transmitted a specified authentication key to the vehicle-external server device. This makes it possible to ensure that only authorized motor vehicles can also call up the vehicle function list, as a result of which the vehicle-internal functions in question can be activated or deactivated according to the vehicle function list that was called up.

A further advantageous embodiment of the invention provides that the authentication key is stored in the control device for a specific vehicle or a specific user identifier (ID). "For a specific vehicle" can mean, for example, that the authentication key comprises, among other things, a chassis number or other identification possibility by means of which it is possible to clearly determine whether it is a particular motor vehicle. Furthermore, it can also be provided that the vehicle function list is assigned to a certain user ID. In the latter case, it is also possible for the vehicle function list to be used across vehicles by a particular person who has been assigned a particular user ID. In this case, the use authorization is therefore not only limited to a particular motor vehicle, but granted to a specific user ID. If a vehicle owner has, for example, subscribed to a number of vehicle-internal functions for a fee, he/she can also continue to use these vehicle-internal functions when changing vehicles by downloading the corresponding vehicle function list with the various authorization releases with his/her new vehicle. Furthermore, it is also possible for one particular person to use the various vehicle-internal functions in different motor vehicles.

In a further advantageous embodiment of the invention, it is provided that only those vehicle-internal functions are activated and deactivated for which respective control units designed for operating the vehicle-internal function have transmitted a specified authentication key to the control device. A check is thus carried out inside the vehicle again to find out whether the respective control units are even authorized to operate the vehicle-internal functions according to the transmitted vehicle function list. As a result of this, the protection against manipulation in the vehicle is further increased. Vehicle-internal manipulation protection preferably also ensures that the transmitted vehicle function list cannot be changed. For this purpose, a location to be called up, for example in a secured control unit, could be protected in a similar way as with a server certificate, for example via a root CA (Root Certificate Authority) or based on a theft protection secret. The correctness of the vehicle function list is preferably checked in addition, for example by means of a comparison to a supplied hash value.

The system according to the invention comprises at least one motor vehicle having a control device and a vehicle-external server device that is designed to carry out the method according to the invention or an advantageous embodiment of the method according to the invention. Advantageous embodiments of the method according to the invention can be regarded as advantageous embodiments of the system according to the invention, the system having, in particular, means for performing the steps of the method.

Further advantages, features and details of the invention arise from the following description of advantageous exemplary embodiments, as well as with reference to the drawing. The features and feature combinations mentioned above in the description, as well as the features and feature combinations mentioned below in the description of the figures and/or shown in the FIGURES alone may not only be used in the particular specified combinations, but also in other combinations or singly, without departing from the scope of the invention.

In the only FIGURE, FIG. 1 shows a schematic representation of a system that comprises a motor vehicle and a vehicle-external server device by means of which various vehicle-internal functions of the motor vehicle can be activated and deactivated.

A system 10 comprises at least one motor vehicle 12 as well as a vehicle-external server device 14. System 10 preferably has a plurality of different motor vehicles 12 that are not, however, shown in the present drawing. The following explanations also apply by analogy to the operation of multiple motor vehicles.

Motor vehicle 12 comprises a control device 16 that is designed to establish a wireless connection 18 with vehicle-external server device 14. Conversely, the vehicle-external server device is designed to establish wireless connection 18. Vehicle-external server device 14 is used to activate and deactivate a variety of vehicle-internal functions 20. Furthermore, motor vehicle 12 comprises control units 22 that are designed to operate respective vehicle-internal functions 20. The vehicle-internal functions 20 can be, for example, various driver assistance systems, such as a cruise control system for maintaining distance between vehicles, an autopilot or the like. Below, a method in which vehicle-internal functions 20 are activated or deactivated is explained in more detail.

A vehicle function list 24 in which it is laid down which of the vehicle-internal functions 20 of motor vehicle 12 are to have a use authorization and which of the vehicle-internal functions 20 of motor vehicle 12 are not to have a use authorization is initially generated by means of vehicle-external server device 14. Vehicle function list 24 can, for example, be created as soon as vehicle-external server device 14 has produced at least one activation specification with regard to at least one of the vehicle-internal functions 20, a use authorization being granted for these vehicle-internal functions 20.

For example, it may be provided that a user of motor vehicle 12 can have one of the vehicle-internal functions 20 activated that could not previously be used. In this case, the aforementioned activation specification with regard to the vehicle-internal function 20 in question is created, a use authorization being produced within generated vehicle function list 24 for this vehicle-internal function.

The user of motor vehicle 12 can select the various vehicle-internal functions 20 and activate them—preferably in exchange for payment—for example via his/her smartphone, via a PC, via a tablet computer or via an interface of motor vehicle 12 (not shown here). In this case, it may be provided that certain subscriptions have a subscription period limitation with respect to vehicle-internal functions 20.

Vehicle function list 24 is then also created by means of vehicle-external server device 14 as soon as vehicle-external server device 14 has produced at least one deactivation specification with regard to at least one of the vehicle-internal functions 20, no use authorization being granted for these vehicle-internal functions 20 or a previously granted use authorization being revoked. For example, the aforementioned deactivation specification is created as soon as a specified operating period has expired for one of the vehicle-internal functions 20. For example, it is possible that the subscription period of a certain subscription has expired or was canceled for one of the vehicle-internal functions 20. In such a case, the aforementioned deactivation specification is created for the vehicle-internal function in question, as a result of which a corresponding vehicle function list 24 is created in which it is specified that the use authorization has been taken away from the vehicle-internal function 20 in question.

Alternately or additionally, it is possible that, for example, a manufacturer of motor vehicle 12 notices that a vehicle-internal function 20 has certain defects. Instead of starting a large-scale recall campaign for all affected motor vehicles 12, vehicle-external server device 14 can be used to easily specify that the use authorization should be revoked at least temporarily for affected vehicle-internal function 20—not for motor vehicle 12 shown here, but for all motor vehicles affected by it.

As soon as the vehicle function list 24 has been created by means of vehicle-external server device 14, vehicle function list 24 is transmitted to control device 16 of motor vehicle 12 via wireless connection 18. For this purpose, control device 16 itself can, for example, have a communication interface that is designed accordingly, it also being just as likely that motor vehicle 12 has a separate communication interface that calls up or receives vehicle function list 24 via wireless connection 18 and then provides it to control device 16.

Control device 16 then controls respective control units 22 designed to operate vehicle-internal functions 20 of motor vehicle 12 according to transmitted and received vehicle function list 24 such that the vehicle-internal functions 20 of motor vehicle 12 having a use authorization according to received vehicle function list 24 and still being deactivated are activated and the vehicle-internal functions 20 of motor vehicle 12 having no use authorization according to received vehicle function list 24 and still being activated are deactivated.

To increase the security when vehicle function list 24 is being transmitted, it may be provided that vehicle function list 24 is only transmitted from vehicle-external server 14 to control device 16 of motor vehicle 12 if control device 16 has transmitted a specified authentication key to vehicle-external server device 14. The authentication key can be stored in control device 16 for a specific vehicle or for a specific user ID.

For a specific vehicle means that vehicle function list 24 is only transmitted to control device 16 if it is proven to also be installed in motor vehicle 12. For a specific user ID can, for example, mean that a person can use vehicle function list 24 across vehicles independently of motor vehicle 12, for example because he/she owns multiple vehicles or frequently drives in different rental cars. In the case of user ID specific authentication, it may, for example, be provided that the person must initially identify himself/herself in motor vehicle 12. This can be done, for example, by entering a login name and a password. Alternately or additionally, it can also be provided, for example, that the person in question is detected and identified via a vehicle-internal camera system. As soon as the person has entered his/her user ID in motor vehicle 12, vehicle function list 24 can be received. The same applies to other motor vehicles not depicted here.

To protect the internal communication between control device 16 and control units 22, it can additionally be provided that only vehicle-internal functions 20 for which respective control units 22 designed for operating the vehicle-internal functions 20 have also transmitted a specified authentication key to control device 16 are activated and deactivated. For example, it may be the case that an unauthorized vehicle function list 24 has been loaded onto control device 16 via a wired connection. If control units 22 do not have a corresponding authentication key for this purpose, the entries in vehicle function list 24 continue to have no effect on the activation and deactivation of vehicle-internal functions 20.

Explained system 10 and the explained method for operating system 10 also provides—in a simple manner—the possibility of deactivating and activating various vehicle-internal functions 20 remotely via a vehicle-external server device 14.

The invention claimed is:

1. A method for operating a motor vehicle, the method comprising:
   receiving, at a control device of the motor vehicle, a vehicle function list from a vehicle-external server device, wherein the vehicle function list is created at the vehicle-external server device and specifies which ones of vehicle-internal functions of the motor vehicle have a use authorization and which ones of the vehicle-internal functions of the motor vehicle have no use authorization;
   controlling, using the control device of the motor vehicle, respective control units designed to operate the vehicle-internal functions of the motor vehicle according to the received vehicle function list such that one or more of the vehicle-internal functions of the motor vehicle having the use authorization and still being deactivated are activated and one or more of the vehicle-internal functions of the motor vehicle having the no use authorization and still being activated are deactivated,
   wherein the vehicle function list is created when at least one deactivation specification with regard to at least one of the vehicle-internal functions is produced by the vehicle-external server device, granting the no use authorization for the at least one of the vehicle-internal functions,
   wherein the deactivation specification is created when there is a malfunction of the at least one of the vehicle-internal functions or of a different vehicle-internal function, and
   wherein vehicle-internal manipulation protection ensures that the received vehicle function list cannot be changed.

2. The method of claim 1, wherein the vehicle function list is created when at least one activation specification with regard to the at least one of the vehicle-internal functions is produced by the vehicle-external server device, granting the use authorization for the at least one of the vehicle-internal functions.

3. The method of claim 1, wherein the deactivation specification is created when a specified operating period associated with the at least one of the vehicle-internal functions has expired.

4. The method of claim 1, further comprising:
   transmitting, by the control device of the motor vehicle to the vehicle-external server, an authentication key.

5. The method of claim 4, wherein the authentication key is stored in the control device of the motor vehicle or for a specific user identifier (ID).

6. The method of claim 1, wherein controlling the control units further comprises:
   receiving, at the control device of the motor vehicle, an authentication key from the control units.

7. The method of claim 1, wherein the vehicle internal functions comprise at least one of a driver assistance system or an autopilot system.

8. A system comprising:
   a vehicle-external server device configured to:
      create a vehicle function list, wherein the vehicle function list specifies which ones of vehicle-internal functions of a motor vehicle have a use authorization and which ones of the vehicle-internal functions of the motor vehicle have no use authorization; and
      transmit the vehicle function list to a control device of the motor vehicle, the control device of the motor vehicle configured to:
      control respective control units designed to operate the vehicle-internal functions of the motor vehicle according to the received vehicle function list such that one or more of the
   vehicle-internal functions of the motor vehicle having the use authorization and still being
   deactivated are activated and one or more of the vehicle-internal functions of the motor
   vehicle having the no use authorization and still being activated are deactivated,
   wherein the vehicle function list is created when the vehicle-external server device produces at least one deactivation specification with regard to at least one of the vehicle-internal functions, granting the no use authorization for the at least one of the vehicle-internal functions,
   wherein the deactivation specification is created when there is a malfunction of the at least one of the vehicle-internal functions or of a different vehicle-internal function, and
   wherein vehicle-internal manipulation protection ensures that the received vehicle function list cannot be changed.

9. The system of claim 8, wherein the vehicle-external server device is further configured to create the vehicle function list when the vehicle-external server device produces at least one activation specification with regard to the at least one of the vehicle-internal functions, granting the use authorization for the at least one of the vehicle-internal functions.

10. The system of claim 8, wherein the vehicle-external server device is further configured to create the deactivation specification when a specified operating period associated with the at least one of the vehicle-internal functions has expired.

11. The system of claim 8, wherein the control device of the motor vehicle is further configured to transmit an authentication key to the vehicle-external server.

12. The system of claim 11, wherein the control device of the motor vehicle is further configured to store the authentication key for the motor vehicle or for a specific user identifier (ID).

13. The system of claim 8, wherein the control device of the motor vehicle is further configured to receive an authentication key from the control units.

14. The system of claim 8, wherein the vehicle internal functions comprise at least one of a driver assistance system or an autopilot system.

\* \* \* \* \*